United States Patent [19]

Yokomizo et al.

[11] Patent Number: 4,517,606
[45] Date of Patent: May 14, 1985

[54] APPARATUS FOR PROCESSING VIDEO SIGNALS

[75] Inventors: Yoshikazu Yokomizo, Kawagoe; Takehiko Shibata, Kokubunji; Katsuichi Shimizu, Kunitachi; Ken Miyagi, Yokohama; Akira Suzuki, Kawasaki; Tadashi Yoshida, Tokyo; Masaharu Tsukata, Kawasaki; Koichi Murakami, Yokohama; Nao Nagashima, Tokyo, all of Japan

[73] Assignee: Canon Kabushiki Kaisha, Tokyo, Japan

[21] Appl. No.: 654,039

[22] Filed: Sep. 21, 1984

Related U.S. Application Data

[63] Continuation of Ser. No. 285,405, Jul. 20, 1981, abandoned.

[30] Foreign Application Priority Data

Jul. 23, 1980 [JP] Japan ............................ 55-101658

[51] Int. Cl.³ ............................................. H04N 1/40
[52] U.S. Cl. ...................................... 358/280; 358/283; 382/50

[58] Field of Search ............... 358/280, 283, 263, 133, 358/138, 282, 284, 256; 382/41, 50

[56] References Cited

U.S. PATENT DOCUMENTS

| 3,739,082 | 6/1973 | Lippel | 358/138 |
|---|---|---|---|
| 4,032,978 | 6/1977 | Wong | 358/283 |
| 4,124,870 | 11/1978 | Schatz et al. | 358/260 |
| 4,258,393 | 3/1981 | Ejiri et al. | 358/283 |
| 4,303,948 | 12/1981 | Arai et al. | 358/287 |
| 4,320,419 | 3/1982 | Cottriall | 358/263 |
| 4,327,380 | 4/1982 | Yamada et al. | 358/264 |
| 4,349,846 | 9/1982 | Sekigawa | 358/280 |

Primary Examiner—John C. Martin
Assistant Examiner—Edward L. Coles
Attorney, Agent, or Firm—Fitzpatrick, Cella, Harper & Scinto

[57] ABSTRACT

A video signal processing apparatus for encoding video into binary signals employs dither coding. The apparatus comprises a device for setting a plural number of divided areas of an original image and a processing circuit for processing video signals corresponding to the respective divided areas using different dither patterns.

45 Claims, 15 Drawing Figures

| FIG. 11A | FIG. 11B |

APPARATUS FOR PROCESSING VIDEO SIGNALS

This application is a continuation of application Ser. No. 285,405 filed July 20, 1981, now abandoned.

BACKGROUND OF THE INVENTION

1. Field of the Invention

The present invention relates to a video signal processing apparatus useful for converting analog input video signals into binary signals employing dither coding.

2. Description of the Prior Arts

Image transmission and recording systems such as facsimile have a problem in particular when the output form is of a black or white binary recording type. This type of transmission system is suitable for character transmission but unsuitable for transmission of a photograph containing halftone.

To solve the problem, hitherto, a method commonly called systematic dither coding has been used. According to the known method, an original picture area is divided into a plural number of picture element groups each group containing about 4 to 32 picture elements. Binary encoding is carried out using a threshold level which is periodically variable for every group. Halftone is represented as the area of black spots gathered in every picture element group.

According to the above mentioned method, an original may be reproduced in many gradations the number of which can be infinite in principle. However, if it is desired to represent very fine gradation, then the number of picture elements in every group necessary for representation of the fine gradation increases up and therefore the dither matrix becomes large to such extent that the quasi halftone screen is too coarse to be acceptable. The reproduction thus obtained is illegible. This is a drawback of the apparatus. When an original containing both characters and a photopicture is to be transmitted, the use of systematic dither brings forth another problem. Although the gradation of the picture can be correctly transmitted, the character portion of the original is transmitted poorly and reproduced illegibly. On the contrary, if the binary encoding is carried out with the threshold level being fixed, the picture portion will be defeatured while the character portion can be transmitted well. These defects contradict each other.

Figure 1:
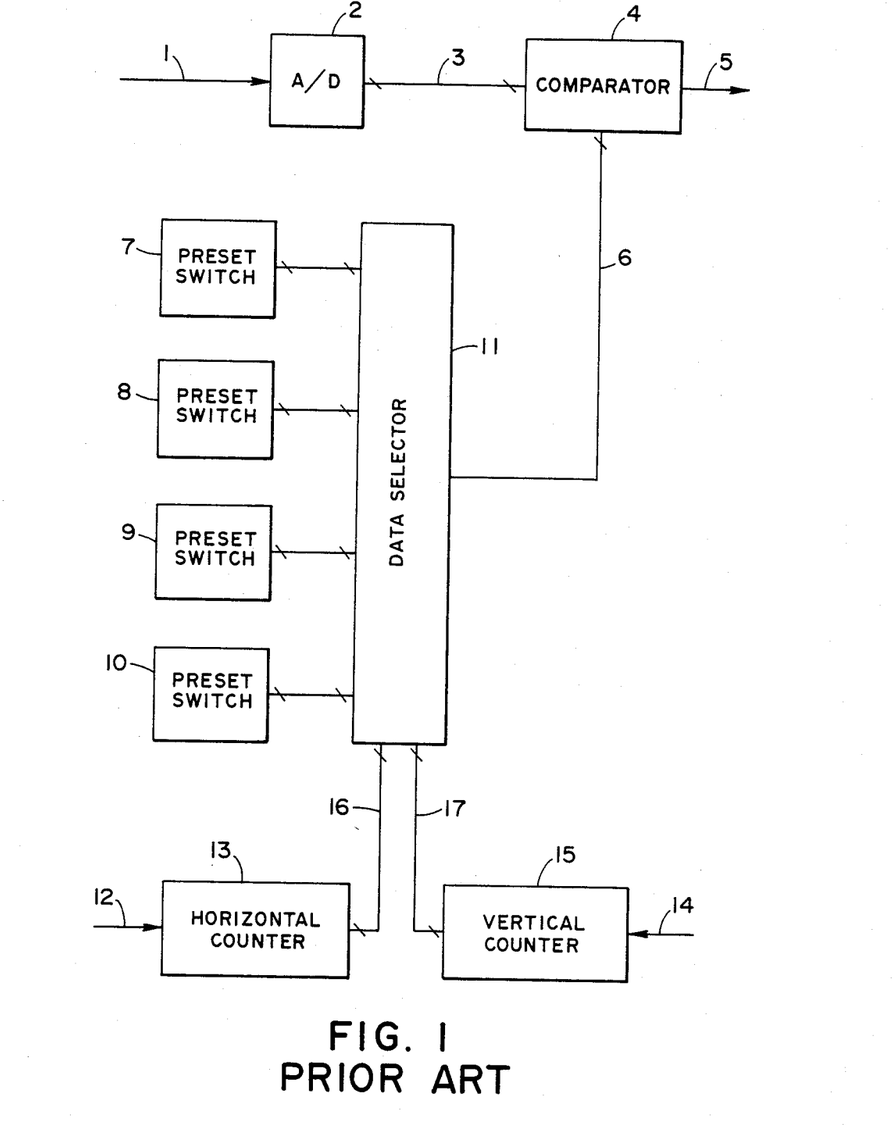
FIG. 1 shows a systematic dither circuit according to the prior art.

FIG. 1 shows a form of the systematic dither circuit according to the prior art. For the purpose of simplification, description is made in connection with a representation of images in four gradations.

In FIG. 1, reference character 1 designates a video signal input terminal through which analog signals are introduced into the circuit. Element 2 is an A-D converter by which the input video signals are quantized. Element 3 designates the signal line for the digital video signals from the A-D converter. The number of bits for quantization is a whole number (n) which is given by:

$$2^n \geq N$$

wherein, N is the required number of gradations of density (blackness). For instance, when it is required to represent the image density in sixteen (16) gradations, then the number of bits for quantization is 4 bits. For purposes of illustration, signal lines having the same function are represented by the single lines using the symbol "—ǂǂ—" in FIG. 1. Therefore, it should be understood that the signal line indicated by the symbol may represent a number of signal lines. This is applied also to the following drawings.

Designated by 4 is a magnitude comparator by which signals on a comparison signal line (hereinafter referred to as dither signal line) are binary compared regarding magnitude. The result is put out from the video signal output terminal 5. The video signal output 5 is a binary signal, that is 0 or 1. Elements 7, 8, 9 and 10 are preset switches for setting dither motors. By selecting the preset dither motor and starting reading there is formed a dither signal 6. This selection is carried out by a data selector 11. The output signal from the data selector, therefore, constitutes the dither signal 6. The sequence in which the preset switches are changed over, is controlled by horizontal and vertical address control lines 16 and 17.

Element 12 is a video transfer clock signal, 3 is a horizontal counter, 14 is a horizontal synchronizing signal and 15 is a vertical counter. Since the dither matrix is desirable to be square, the number of bits y of the horizontal address control line 16 is equal to the number of bits x of the vertical address control line 17. In the shown example, by setting the bit to $x=y=1$, there can be formed a square dither matrix of $$2 \times 2 = 4.$$

Figure 2:
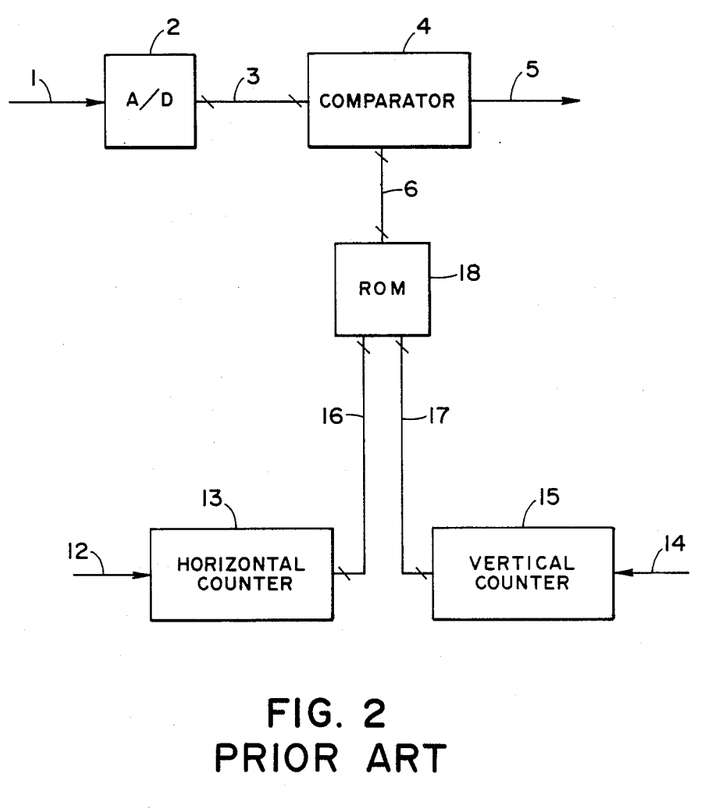
FIG. 2 shows another systematic dither circuit according to the prior art employing a ROM.

FIG. 2 shows another form of the dither circuit according to the prior art. In this second prior art apparatus, preset switches 7, 8, 9 and 10 are omitted. Instead, a dither pattern is previously written in a read only memory (ROM) to carry out systematic dither. Like reference numerals to FIG. 1 represent the same and corresponding elements.

Element 18 is a ROM for dither matrix. The memory capacity required for ROM 18 is, in the shown example, 4 bit. The numbers of bits z of the output line of ROM 18, that is, dither signal 6 may be equal to or less than the number of bits n of the output 3 from A-D converter 2. The sum of the number of bits y of the horizontal address control line 16 and the number of bits x of the vertical address control line 17 may be set to be equal to or more or less than the number of bits n of the output 3 from A-D converter 2. However, representation of the maximum gradation at the minimum cost is possible only when $n = Z = (X+y)$ The prior art systems described above have the previously mentioned drawbacks.

SUMMARY OF THE INVENTION

Accordingly, it is the general object of the invention to eliminate the drawbacks involved in the prior art apparatus mentioned above.

More specifically, it is an object of the invention to provide a video signal processing apparatus in which video signals are processed using different dither patterns for different areas.

It is another object of the invention to provide a video signal processing appratus which enables a combination of picture image and character image using dither matrixes.

Other and further objects, features and advantages of the invention will appear more fully from the following description taken in connection with the accompanying drawings.

BRIEF DESCRIPTION OF THE DRAWINGS

FIG. 4 shows an arrangement of FIGS. 4A and 4B, FIGS. 4A and 4B show a composite dither circuit arranged in accordance with FIG. 4;

FIG. 11 shows an arrangement of FIGS. 11A and 11B, FIGS. 11A and 11B show a circuit diagram of a composite dither for output of character pattern arranged in accordance with FIG. 11.

DETAILED DESCRIPTION OF THE PREFERRED EMBODIMENTS

Figure 3:
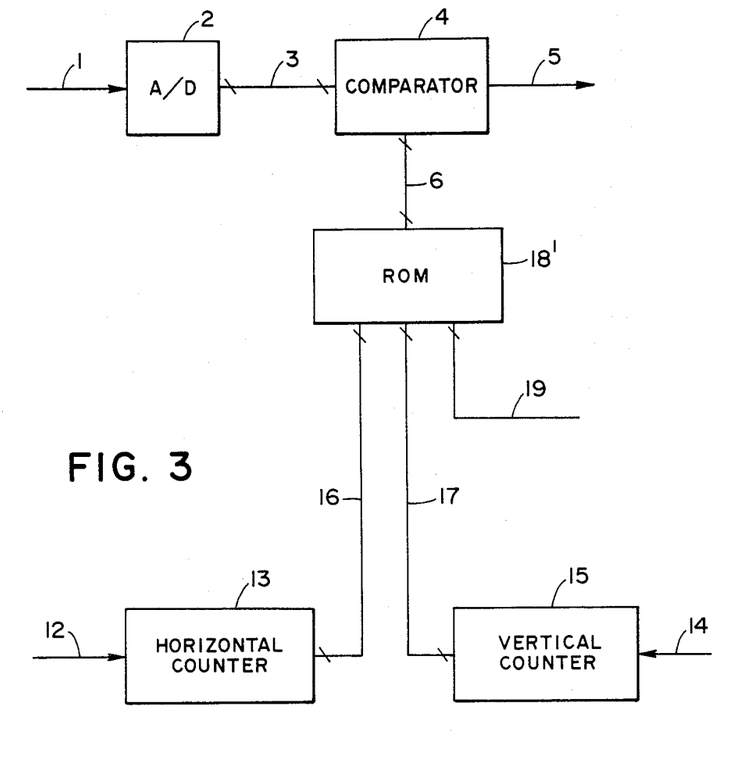
FIG. 3 shows a dither switching circuit to which the present invention is applicable.

FIG. 3 shows a basic form of the dither switching circuit according to the invention.

In FIG. 3, like characters to FIGS. 1 and 2 represent the same or corresponding elements. For example, if there are used two 2×2 dither matrixes while switching over from one to the other, ROM 18' has to have a memory capacity two times larger than that of the dither matrix ROM 18 shown in FIG. 2, and one line is added to the address lines, which is used as dither switch-over control line 19. In this case, programming will be made easy by setting the dither switch-over control line 19 to MSB (MOST SIGNIFICANT BIT) of address of ROM 18'. By setting the control line 19 to "H" (high level) or "L" (low level), the change-over between the two dither matrixes can be performed in a moment. More particularly, two different dither patterns can be used for one and same original by switching the control line 19 to a determined value for a determined area during the operation of reading the original. Thus, for an original containing a photo picture and line drawings such as characters, the two dither patterns can be switched over from that for the area of photo picture to that for the area of line drawings or vice versa.

Figure 4:
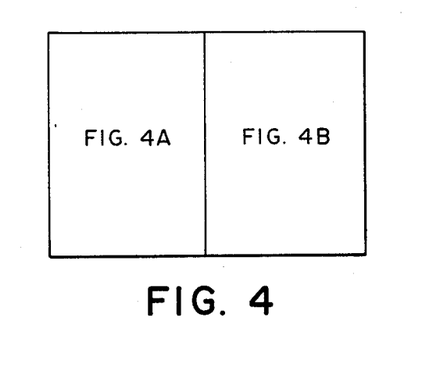

To realize the above switch-over between dither patterns, it is necessary to provide further a circuit for selecting the area at will and a circuit for allocating any one of the dither patterns to the selected area. These circuits will be described in detail hereinafter with reference to FIG. 4.

Figure 4A:
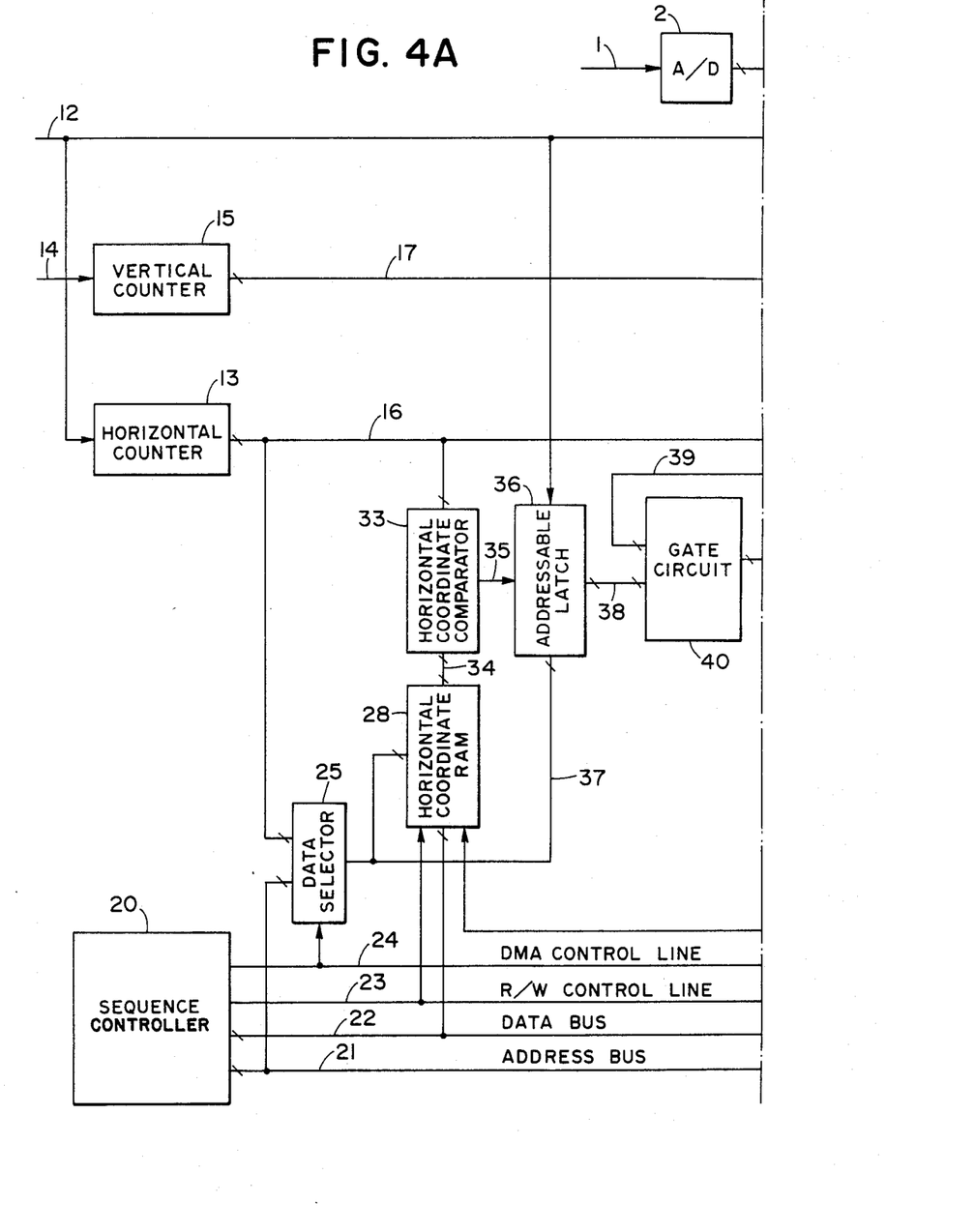
Figure 4B:
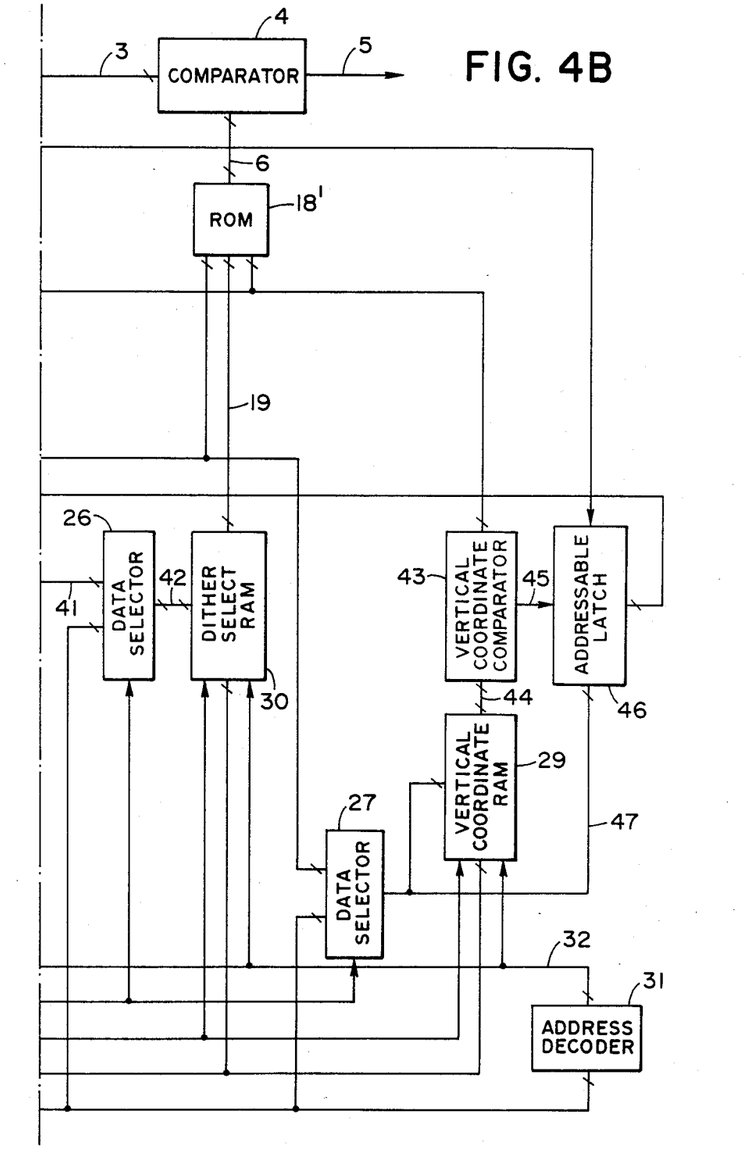

FIGS. 4A and 4B a block diagram of a composite dither circuit.

In FIGS. 4A and 4B, like characters to FIGS. 1, 2 and 3 represent the same and corresponding elements.

Designated by 20 is a sequence controller which may be a microcomputer of the type whose data and address busses are led out to the external part. Element 21 is the address bus and 22 is the data bus. Element 23 is a read-/write control line and 24 is a direct memory access (DMA) control line extending through an output port provided with a latch function.

All of the control lines 21–24 extending from the sequence controller 20 are used to control random access memories (RAM) 28, 29 and 30. In view of function, RAM 28, 29 and 30 are referred to hereinafter also as horizontal coordinate memory 28, vertical coordinate memory 29 and dither select memory 30. The input data lines of these memories 28, 29 and 30 are connected to the data bus 22 whereas their output data lines 34, 44 and 19 are independent of each other. These memories 28, 29 and 30 are selected and controlled independently of each other by the memory selection control line 32 extending from an address decoder 31. When selected and controlled by the control 32, the selected memories become write inable. On the contrary, when DMA control line 24 is in DMA mode, these memories 28, 29 and 30 selected and controlled all at once by a common control line (not shown) to make all of the memories read inable.

25, 26 and 27 are data selectors which are connected to the address bus 21 when DMA control line 24 is not in DMA mode. The data selectors 25, 26 and 27 have output lines 37, 42 and 47 respectively. In view of function, these output lines are hereinafter referred to also as dither matrix horizontal address control line 37, dither selection memory address control line 42 and dither matrix vertical address control line 47. In the shown embodiment, each the control line 37, 42, 47 is a 2 bit control line and the control lines 37, 42, and 47 are allotted in this order from the LSB side of the address bus 21.

The address decoder 31 decodes the MSB side of the address bus 21. With such arrangement, RAM 28, 29 and 30 can be located in a portion of the memory address space in the microcomputer within the sequence controller 20 and they are accessible without any need of distinction from other memories within the sequence controller 20.

Contents to be written in the memories 28, 29 and 30 will be described hereinafter with reference to FIG. 5.

Figure 5:
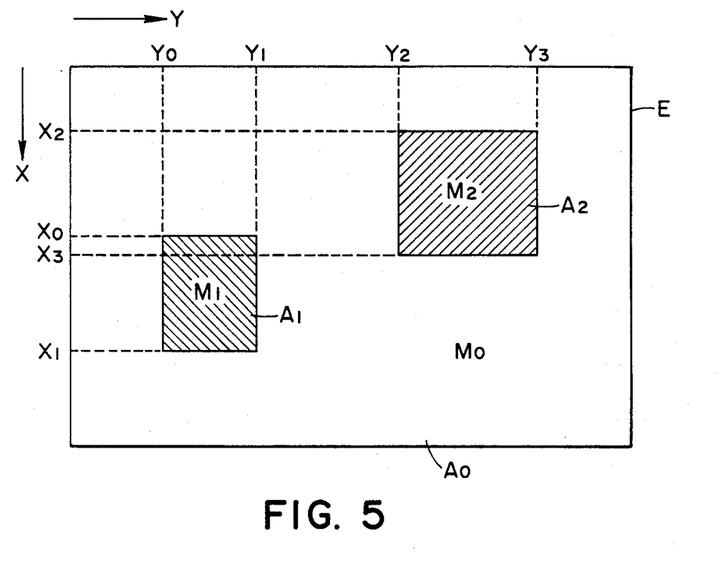
FIG. 5 shows a dither composite format.
Figure 6:
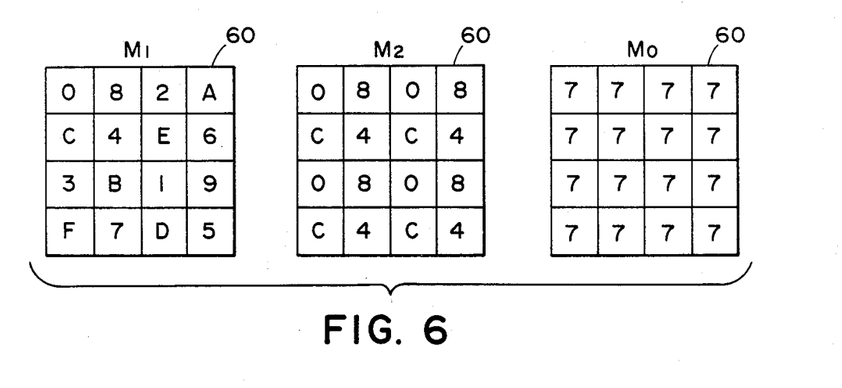
FIG. 6 shows an example of dither matrixes $M_0$, $M_1$ and $M_2$.

FIG. 5 shows a dither composite format wherein $A_0$–$A_2$ are areas. Y and X are horizontal and vertical coordinates respectively. $M_0$, $M_1$ and $M_2$ designate dither matrixes to be applied to the area $A_0$, $A_1$ and $A_2$ respectively. E is an outer frame whose size is the same as the size of an original in terms of address. The dither $M_0$ is applied to the area $A_0$. To the two sectional areas $A_1$ and $A_2$ there are applied dithers $M_1$ and $M_2$ as an example. The area $A_1$ is defined by horizontal coordinates $Y_0$ and $Y_1$ and vertical coordinates $X_0$ and $X_1$. Similarly, the area $A_2$ is defined by $Y_2$, $Y_3$ and $X_2$, $X_3$. If the original contains two pictures, then coordinates $X_0$–$X_3$ and $Y_0$–$Y_3$ are set and a dither suitable for representation of halftone is assigned for $M_1$ and $M_2$ whereas a dither suitable for representation of characters is assigned for $M_0$. For example, dither matrixes as shown in FIG. 6 have previously been written in the memory 18'. $M_1$ reproduces 16 gradations $M_2$ reproduces 4 gradations and $M_0$ reproduces binary, white and black. Numeral characters in the block 60 show threshold levels in hexadecimal notation.

As shown in FIGS. 4A and 4B, the horizontal coordinates $Y_0$, $Y_1$ and $Y_2$ are written in the vertical coordinate memory 28 and the vertical coordinates $X_0$, $X_1$ and $X_2$ are writted in the vertical coordinate memory 29. Written in the dither select memory 30 are dither numerals, $M_0$, $M_1$ and $M_2$.

For DMA mode, the dither matrix horizontal address control line 37 is connected to the horizontal address control line 16. Designated by 33 is a horizontal coordinate comparator in which the horizontal coordinate memory output data line 34 is compared with the horizontal address control line 16. 35 is the output line from the comparator 33. When the number of horizontal coordinate data Yn is four (4), it will need four comparator circuits 33. However, in the shown embodiment, only one circuit deals with the tasks according to time division system. To this end, there is provided an addressable latch 36 which addresses by the dither matrix address control line 37 and latches in response to the video transfer clock signal 12. Reference numeral 38 designates outputs from the addressable latch 36. In view of its function, the output line is referred to hereinafter also as dither area horizontal select line 38. In the shown embodiment, the number of the control lines 37 are two. Therefore, four lines may be decoded by binary decoding at the addressable latch 36. Namely, the dither area horizontal select line 38 includes four lines corresponding to the horizontal coordinate data $Y_0$, $Y_1$, $Y_2$ and $Y_3$ respectively. The dither area horizontal select line can set the areas $A_1$ and $A_2$ (FIG. 5) only in the horizontal direction. Therefore, also in the vertical direction, the areas are set in a manner similar to that described above in connection with the horizontal direction. Thus, there is obtained the dither area vertical select line 39 as the output from addressable latch 46. By forming a logical product of the two outputs 38 and 39, setting of the area is completed in both of the horizontal and vertical directions. For this purpose, there are provided an AND gate 40 and a dither area select line 41 for the area set in both of the horizontal and vertical directions. For DMA mode, the data selector 26 selects this dither area select line 41. Its output line 42 is referred to as dither select memory address control line in view of function. In the shown embodiment, this control line 42 includes two lines so that the previously written dither number, $M_0$, $M_1$ or $M_2$ can be selected by it and the selected dither number can be put out to the dither switch-over control line 19. The operation of ROM 18' for dither matrix has already been described with reference to FIG. 3. Area setting in the vertical direction is carried out in the same manner in principle as that in the horizontal direction.

As for the vertical direction, 43 is vertical coordinate comparator, 44 is vertical coordinate memory output data line, 45 is vertical coordinate comparator output line, 46 is addressable latch and 47 is dither matrix vertical address control line.

As to the size of dither matrix, it will be understood that when one side of the matrix corresponds to $2^n$ (n=1, 2, 3, 4 . . .) of one picture element, all of the matrixes may be formed from a matrix having the largest area. Therefore, it is required to provide such apparatus which is able to set the area of the largest dither matrix then used.

Figures 7, 8:
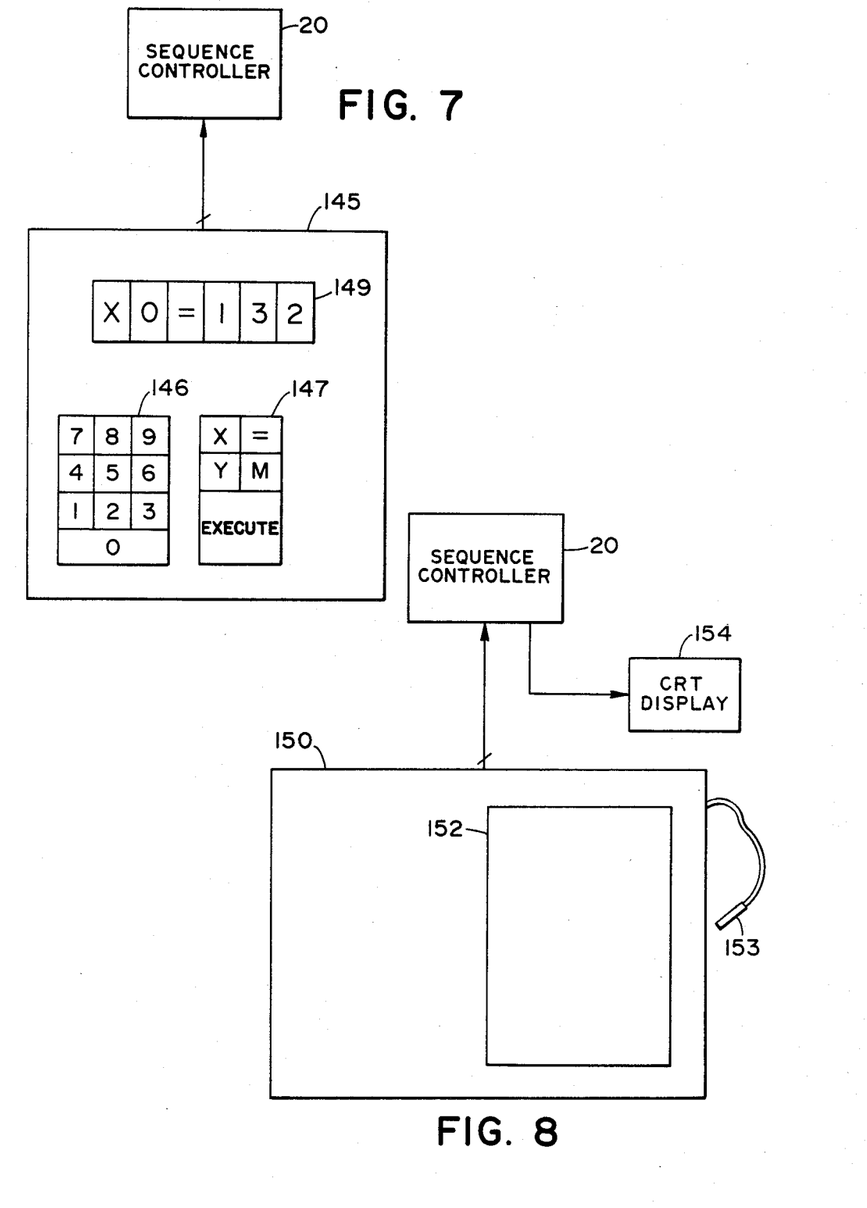
FIG. 7 shows X-Y coordinate input apparatus with key input.
FIG. 8 shows X-Y coordinate input apparatus with digitizer.

FIGS. 7 and 8 show concrete examples of XY coordinate input apparatus for setting the area.

The XY coordinate input apparatus 145 shown in FIG. 7 is of key input type. Reference number 146 designates ten key switches, 147 are X, Y, M, = and EXECUTE keys, 148 are function keys and 149 is a light emitting display. If it is desired to set the coordinate of $X_0$, for instance, to 132 mm with this input apparatus, then the keys are actuated in the following manner:

"X" "0" "=" "1" "3" "2" "EXECUTE"

By pushing the keys in this manner, the input information is displayed on the light emitting display device 149 and also a value corresponding to 132 mm is put into $X_0$ memory 40. Inputs of other coordinates can be carried out in the same procedure. The function of EXECUTE key is to make the provisionally registered and displayed value finally registered in due form.

XY coordinate input apparatus shown in FIG. 8 is different from the input apparatus shown in FIG. 7 in that the input of coordinates are carried out not in the form of numerical value but by a stylus pen 153. In FIG. 8, reference numeral 150 designates a digitizer and 152 is a coordinate setting area. Input is carried out by bringing the stylus pen 153 into contact with the area 152 on the digitizer 150. Therefore, with this apparatus, it is possible to set coordinates with the original being placed on the coordinate setting area 152 using the stylus pen 153. The area set in this manner is graphically displayed on CRT display 154 together with characters such as $X_0$, $X_1$ etc. The coordinates set by the stylus pen 153 are put in the sequence controller 20 as digital values.

Such dither matrix as $M_0$ in FIG. 6 in which the threshold level is constant throughout all of the cells of the matrix may be considered also as an example of systematic dither matrix.

While in the above embodiments, the dither matrix ROM 18' has been described to have dither patterns written therein, other data also may be written in ROM 18'. If dither data equal to or smaller than the minimum value of the quantized digital video signal 3 or dither data equal to or larger than the maximum value of the signal 3 are written in the dither matrix ROM 18', then it is possible to make the video signal output 5 remain always black or white irrespective of the level of the input video signal 1. Making use of it, the memory 18' may be used as a so-called character generator. For example, if particular characters such as Arabic numerals have previously been written in the memory 18', then the stored particular characters may be put out also as video signals. Furthermore, by suitably combining the horizontal and vertical coordinate memories 28 and 29 and the dither select memory 30 it is possible to write in additionally some simple sentence such as page or date by reading it at real time. The features of this type of character output will be described hereinafter with reference to FIGS. 9 and 10.

Figure 9:
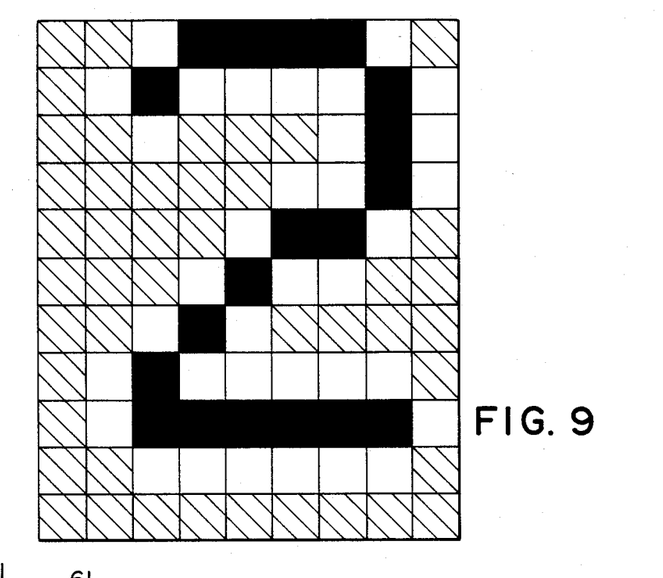
FIG. 9 shows an example of character pattern output by dither processing.
Figure 10:
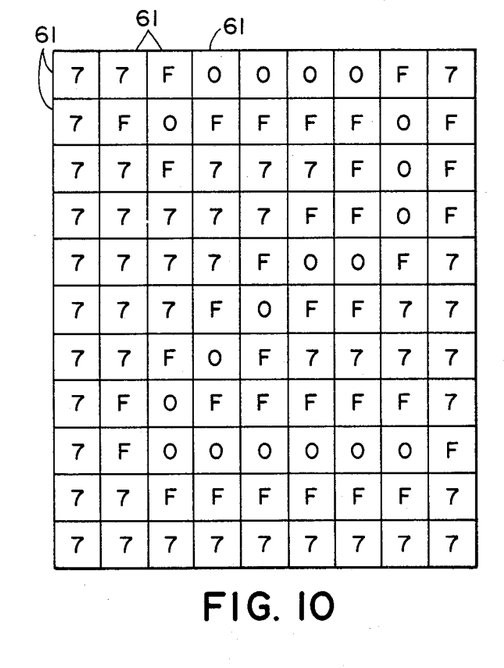
FIG. 10 shows the threshold of the dither matrix necessary for obtaining the output shown in FIG. 9.

FIG. 9 shows an example of the above described particular application form of dither matrix. In this example, a numeral "2" is obtained as an output. The dither matrix used for this purpose is shown in FIG. 10. The number of gradations in this example is 16. The numbers in FIG. 10 indicate the levels of blackness in terms of hexacode of 4 bit binary value. Area of "0" in FIG. 10 becomes black irrespective of the level of video signal and therefore the numeral "2" appears as shown in FIG. 9. The area of "F" becomes white irrespective of the level of video signal and therefore the character "2" is rimmed with white. On the contrary, the area of "7" is displayed by correctly digitized binary video signals and therefore this area becomes the portion with slant lines in FIG. 9 in which portion no video signals have been lost. In this manner, a composition of picture image and character pattern can be attained in such form that the composition may give one's eyes an impression as if it were a natural representation.

Figure 11:
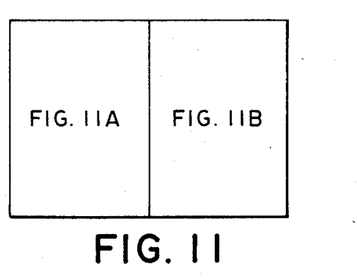
Figure 11A:
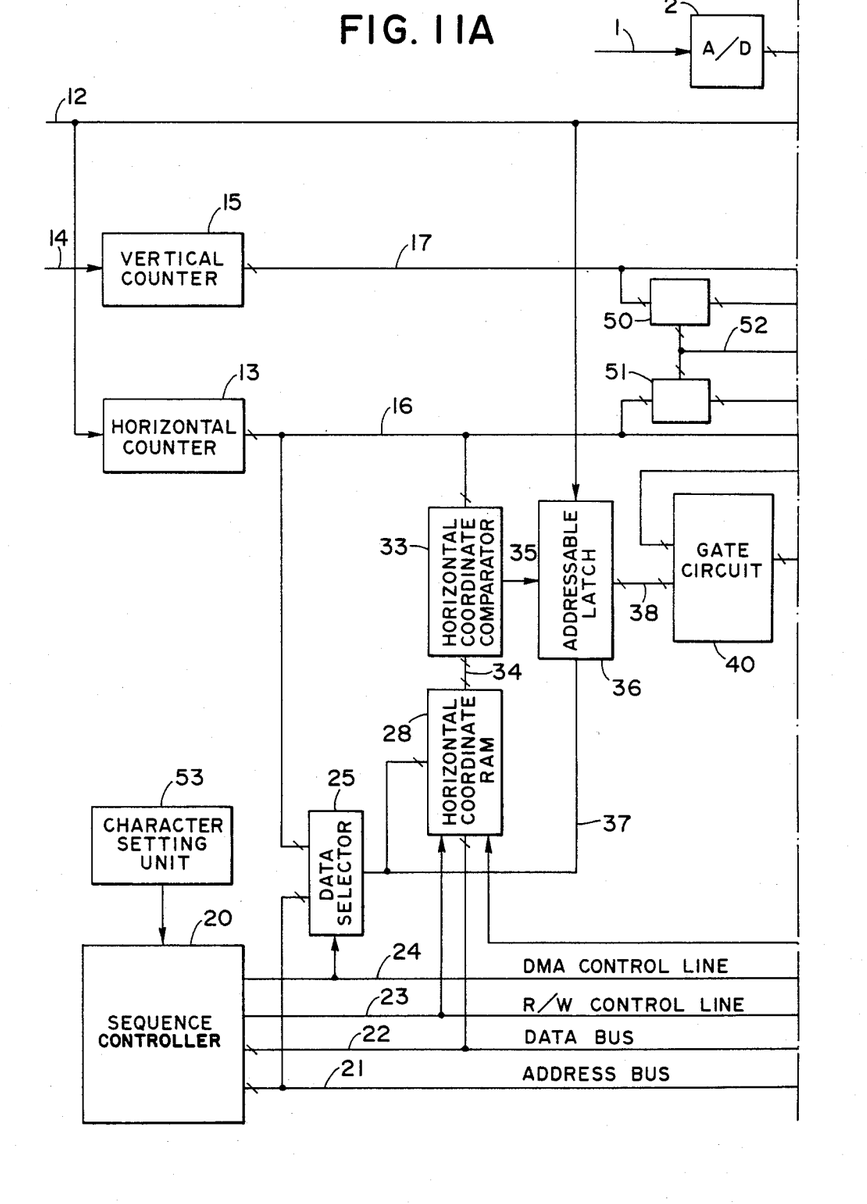
Figure 11B:
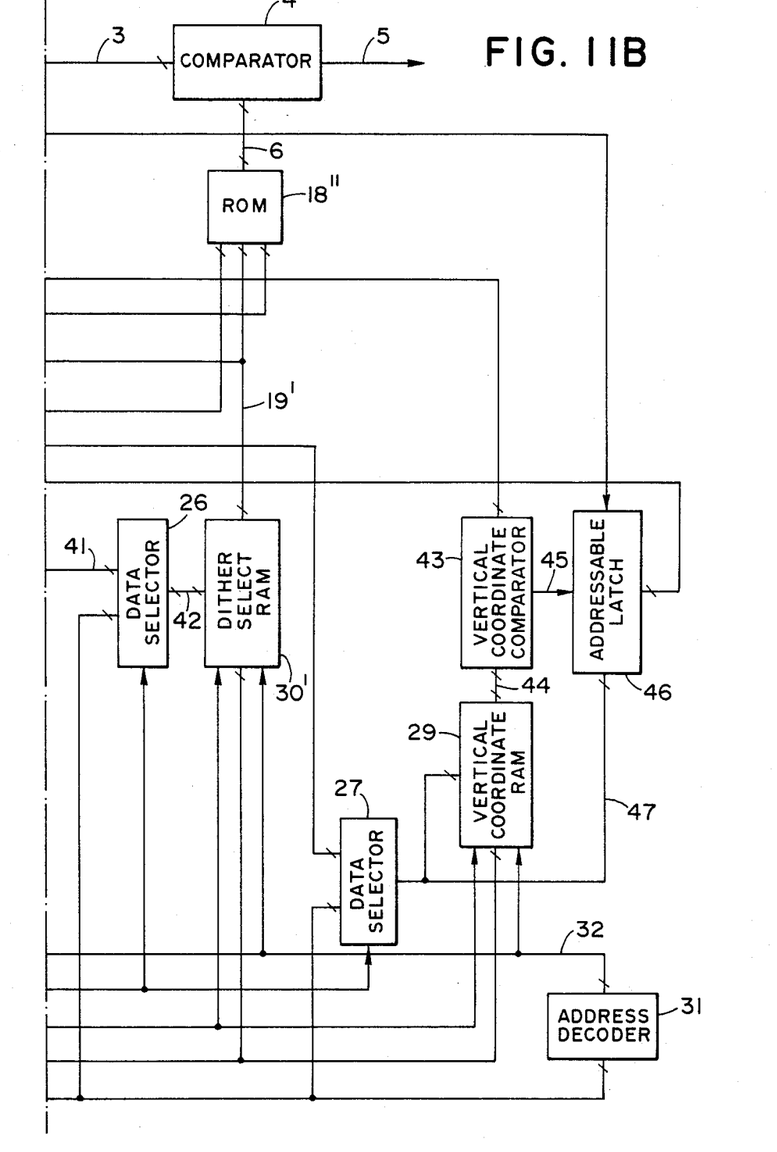

FIGS. 11A and 11B show an embodiment of signal processing apparatus useful for above composite dither. Like characters to FIGS. 4A and 4B represent the same or corresponding elements.

In this embodiment, ROM 18" has dither matrixes containing character patterns as shown in FIG. 10 registered therein in addition to ordinary dither matrixes. 53 is a character setting unit. Dither select RAM 30' can select not only the ordinary dither matrix but also the dither matrix containing character pattern set by the unit 53. Therefore, the output line 19' has a larger number of bits than the output line 19 shown in FIG. 4B. Of the lines contained in the output line 19', line 52 is a character pattern control line for changing over the multiplier for the multipliers 50 and 51 from one to another. For instance, when the ordinary dither is to be applied, the multiplier is set to 1. When one of the stored character patterns is to be put out, the dither select RAM 30 selects a dither having the desired character pattern stored in ROM 18". At the same time, the multiplier is set to $\frac{1}{8}$ by the control line 52 to forward the dots 61 shown in FIG. 10 stepwise one by one every 8 pulses of the horizontal and vertical clocks. Therefore, an output of the character pattern in which one dot 61 is composed of 8×8 picture elements is performed and, at the same time, an image based on the video signal 1 is formed around the character pattern.

If the control line 52 is made to have a plural number of bits and also a plural number of interchangeable multipliers are provided, then it will be made possible to select the size of the character patterns from groups of various sizes. For example, such character pattern in which one dot 61 is composed of 16×16 picture elements can be produced by setting the multiplier to 1/16. By providing such means for changing the multiplier in this manner, the capacity of the memory can be reduced to a great extent.

As the sequence controller 20 there may be used M6800 supplied by Motorola and as the data selector 25, 26, 27 there may be used SN 74157 supplied by Texas Instruments. Also, there may be used, for example, I 3101 by Intel for the horizontal and vertical coordinate memories 28, 29 and dither select memory 30, 30'; SN 7485 by Texas Instruments for the horizontal and vertical coordinate comparators; SN 7442 by Texas Instruments for the address decoder 31; SN 74259 by Texas Instruments for addressable latches 36, 46; SN 74163 by Texas Instruments for horizontal counter and SN 74164 by Texas Instruments for vertical counter.

As readily understood from the foregoing, the present invention has solved a difficult problem involved in reproduction of images employing a binary recording process. In this type of image reproduction, when character and picture are to be recorded at the same time, two different conditions which are contradictory to each other should be satisfied at the same time. For character recording, importance has to be attached to resolving power. On the contrary, for picture recording, great emphasis has to be laid on the ability to represent the gradation. It is the problem how to satisfy the contradictory conditions. According to the invention, the problem has been solved by providing means for setting different areas and a processing circuit for processing video signals using different dither patterns for different areas.

Furthermore, according to the invention, character and picture information can be compounded in a natural form by writing one or more character patterns in the dither matrix memory.

While in the above embodiment dither patterns have been shown and described to be fixed in dither matrix ROM 18', the memory 18 or 18' may be RAM. In this case, like other memories 28, 29, 30, 30', the memory 18 or 18' may be connected to the bus lines so as to rewrite an abundance of dither patterns within the sequence controller 20 into a form suitable for the purposes for which the dither patterns are to be used.

Also, it is not always necessary to connect the address bus 21 and data bus 22 directly to the bus lines of the microcomputer within the sequence controller 20. The connection may be made through input-output ports.

Obviously many other modifications and changes of the particularly shown embodiments are possible in the light of the above teachings.

For example, the number of areas used to set the dither area is never limited only to two. It may be one or three or more. While the detections of horizontal address and vertical address have been conducted, each using one comparator 33 and 43, in time divisional detection, there may be used one comparator and one memory for each one address data. A combination of the type shown in the embodiment and the type mentioned above also may be used.

Also, to count the vertical addresses there may be used the microcomputer within the sequence controller 20 so as to carry out counting in a fashion of software instead of hardware.

Further, a part or all of the hardware functions to drive the memories 28, 29 and 30 and/or a part or all of functions of these horizontal coordinate memory 28, vertical coordinate memory 29 and dither select memory 30 may be replaced by processing operations in a fashion of software using the microcomputer within the sequence controller 20.

Furthermore, while in the shown embodiment, the dither matrix data have been compared digitally by the magnitude comparator 4 through the dither signal line 6, the dither signal 6 may be D-A converted instead of A-D converter 2. The D-A converter output is used as a reference signal for an analog comparator to carry out binary digitizing.

In the shown embodiments, the video signal processing apparatus according to the invention has been described to be of the type which is used simultaneously with a driving a reading apparatus. However, the present invention is never limited to suct type of video signal processing apparatus. The present invention is applicable to another type of processing apparatus in which the quantized video signals 3 are at first stored in a memory and thereafter the signals are processed.

Therefore, it is to be understood that within the scope of the appended claims, the invention may be practiced otherwise than as specifically described.

What we claim is:

1. A video signal processing apparatus for providing binary encoded video signals employing a dither coding system, said apparatus comprising:
   means for reading an original image;
   area setting means for dividing an original image into plural unequal areas; and
   processing means for providing binary encoded signals for video signals from said reading means employing different dither patterns for each of said plural areas.

2. A video signal processing apparatus according to claim 1, wherein said processing means comprises memory means for registering therein a plural number of dither patterns and a selector means for selecting said dither patterns corresponding to said areas respectively.

3. A video signal processing apparatus according to claim 2, wherein said memory means has one or more dither patterns containing character patterns registered therein.

4. A video signal processing apparatus according to claim 1, wherein said video signal is an analog signal which has read said original image.

5. A video signal processing apparatus according to claim 4, wherein said apparatus further comprises an A/D converting circuit for converting said analog signal into a digital signal.

6. A video signal processing apparatus according to claim 1, wherein said processing means includes a discriminating means for discriminating whether or not the video signal being put out is a video signal derived from the area divided by said area setting means.

7. A video signal processing apparatus according to claim 6, wherein said discriminating means comprises a memory for registering therein the vertical and horizontal coordinates of said set area and a means for comparing the output signal from said memory with the signal indicative of the vertical and horizontal coordinate position of the video signal now being put out.

8. A video signal processing apparatus according to claim 1, wherein a coordinate setting device with key input is used as said area setting means.

9. A video signal processing apparatus according to claim 1, wherein a coordinate setting device with a digitizer is used as said area setting means.

10. A video signal processing apparatus according to claim 1, wherein one of said dither patterns is a dither pattern suitable for reproduction of halftones and the other is a dither pattern suitable for reproduction of characters.

11. A video signal processing apparatus according to claim 10, wherein said dither pattern suitable for reproduction of character has a threshold level fixed to a determined value.

12. A video signal processing apparatus according to claim 1 further comprising means for indicating a dither pattern associated with each respective one of the areas set by said area setting means.

13. A video signal processing apparatus comprising:
means for generating video signals;
means for selecting a character;
means for generating threshold signals; and
binary encoding means for comparing said video signal with said threshold signal to produce a binary encoded signal, wherein said threshold signal generating means produces, according to the output of said character selecting means, a threshold signal equal to or larger than the maximum value of the video signal for the character portion and a threshold signal equal to or smaller than the minimum value of the video signal for the portion near the character.

14. A video signal processing apparatus according to claim 13, wherein said threshold signal generating means produces a signal of the intermediate level of the video signal for other portions than said character portion and portion near the character.

15. A video signal processing apparatus according to claim 13, wherein said threshold signal generating means has one or more dither matrixes registered therein.

16. A video signal processing apparatus comprises:
means for reading an original image and generating image information;
means for manually setting an arbitrary image area of said original image by inputting vertical and horizontal coordinates; and
processing means for effecting a binary coding processing for image information of the image area set by said area setting means,
wherein said processing means effecting a first halftone processing for the image information within the area set by said area setting means, and a second halftone processing for image information out of the area set by said area setting means, said second halftone processing being different from said first halftone processing.

17. A video signal processing apparatus according to claim 16, wherein said area setting means sets the image area with a plurality of pairs of vertical and horizontal coordinates.

18. A video signal processing apparatus according to claim 17, wherein said area setting means sets the image area with two pairs of vertical and horizontal coordinates.

19. A video signal processing apparatus according to claim 16, wherein said processing means effecting a binary coding processing for said image information for a halftone reproduction.

20. A video signal processing apparatus according to claim 19, wherein said processing means has a plurality of threshold groups for the different halftone reproduction, and selects one of the threshold groups in accordance with an area designation of said area setting means.

21. A video signal processing apparatus comprising:
means for entering image information;
storage means for storing plural threshold groups comprising a plurality of thresholds;
means for discriminating a character area of the image information; and
processing means for effecting a binary coding processing for the image information in the area discriminated by said discriminating means in accordance with one of said threshold groups read out from said storage means.

22. A video signal processing apparatus according to claim 21, wherein said storage means stores a threshold group for halftone reproduction.

23. A video signal processing apparatus according to claim 22, wherein said processing means effects a binary coding processing for halftone reproduction for the image information out of said character area.

24. A video signal processing apparatus according to claim 21, wherein said processing means has means for comparing said image information and the thresholds from said storage means.

25. A video signal processing apparatus according to claim 21, wherein said storage means stores a threshold group comprising a plurality of the same level of thresholds for providing binary encoded signals for the image information in the character area.

26. A video signal processing apparatus according to claim 21 further comprising means for setting said character area.

27. A video signal processing apparatus comprising:
input means for entering image information;
setting means for setting a plurality of desired arbitrary areas of image; and
processing means for effecting a desired image processing for respective image information of the plurality of areas of image set by said setting means.

28. A video signal processing apparatus according to claim 27, wherein said input means is means for reading out an original image, and said setting means sets an area of an original.

29. A video signal processing apparatus according to claim 27, wherein said processing means effects different image processing for image information in each of the plurality of areas of image set by said setting means.

30. A video signal processing apparatus according to claim 27, wherein said processing means effects a first halftone processing for the image information within the area set by said setting means, and a second halftone processing for image information out of the area set by said setting means, said second halftone processing being different from said first halftone processing.

31. A video signal processing apparatus according to claim 27 further comprising means for selecting an image processing mode associated with each respective one of said plurality of areas of image set by said setting means.

32. A video signal processing apparatus according to claim 27 wherein said setting means sets the image area with two pairs of vertical and horizontal coordinates.

33. A video signal processing apparatus comprising:
means for reading an original image;
means for setting different binary encoding modes for each of plural unequal areas of an original; and
processing means for providing different binary encoded signals for each such area for video signals from said reading means in accordance with the mode set by said setting means, said processing means having memory means which has stored thresholds for halftone reproduction, and said processing means performing a binary encoding processing for halftone reproduction, using the thresholds stored in said memory means, for the video signal from at least one of said plural areas.

34. A video signal processing apparatus according to claim 33 wherein said memory means has a plurality of threshold groups to provide binary encoded signals for said video signals and processing means selects one of said threshold groups in accordance with the mode set by said setting means.

35. A video signal processing apparatus according to claim 33 further comprising area setting means for setting a desired area of said original image.

36. A video signal processing apparatus according to claim 33 wherein said processing means includes means for detecting the area of said original image.

37. A video signal processing apparatus comprising:
means for reading on original image to generate a video signal;
means for designating a desired arbitrary area of an original image by inputting plural coordinates; and
processing means for processing the video signal generated by said reading means wherein said processing means process the video signal from the area designated by said designating means and the video signal from an area other than the designated area differently from each other, said processing means performing a binary encoding processing for halftone reproduction for the video signal at least from the designated area.

38. A video signal processing apparatus according to claim 37 wherein said designating means has key switches for designating the desired area of said original image.

39. A video signal processing apparatus according to claim 37 wherein said processing means includes means for identifying whether or not the video signal is read out from the area designated by said designating means.

40. A video signal processing apparatus according to claim 37 wherein said processing means includes means for storing a threshold group for halftone reproduction.

41. A video signal processing apparatus according to claim 37 wherein said processing means also provides a binary encoding processing for character image reproduction.

42. A video signal processing apparatus comprising:
means for entering a video signal;
means for generating different thresholds for providing a binary encoded signal for the video signal entered from said entering means;
means for designating, by inputting plural coordinates, an arbitrary portion of said video signal for processing by employing the different thresholds from said generating means; and
processing means for providing binary encoded signals for the video signals entered from said entering means employing the plural thresholds from said generating means, wherein at least one of the plural thresholds is used for a halftone reproduction.

43. A video signal processing apparatus according to claim 42 wherein said processing means includes means for comparing the video signal entered from said entering means and the threshold generated from said generating means.

44. A video signal processing apparatus according to claim 42 further comprising means for selecting the threshold to be generated from said generating means.

45. A video signal processing apparatus according to claim 42 further comprising means for storing the threshold for halftone reproduction, wherein said generating means reads out said threshold from said storing means.

* * * * *

UNITED STATES PATENT AND TRADEMARK OFFICE
CERTIFICATE OF CORRECTION

PATENT NO. : 4,517,606
DATED : May 14, 1985
INVENTOR(S) : YOSHIKAZU YOKOMIZO, ET AL.

It is certified that error appears in the above-identified patent and that said Letters Patent is hereby corrected as shown below:

Column 2: line 18, after "signal" change "3" to --13--;
Column 2: line 48, change "n=Z=(X+y)" to --n=z=(x+y)--.
Column 3: line 47, before "same" insert --the--.
Column 4: line 29, delete "the";
          line 45, change "area" to --areas--;
          line 59, after "gradations" insert a comma;
          line 66, change "writted" to --written--.
Column 5: line 38, after "of" insert --its--.
Column 6: line 2, in the formula, before "=" add --"--.
Column 8: line 51, after "driving" delete --a--;
          line 52, change "suct" to --such--.
Column 9: line 27, delete "a".
Column 10: line 5, change "comprises" to --comprising--;
          line 14, change "effecting" to --effects--.
Column 11: line 49, After "and" insert -- and --.

Signed and Sealed this

Twenty-eighth Day of January 1986

[SEAL]

Attest:

DONALD J. QUIGG

Attesting Officer    Commissioner of Patents and Trademarks